United States Patent [19]

Zini

[11] 4,257,562

[45] Mar. 24, 1981

[54] APPARATUS FOR FEEDING LIQUID ADHESIVE

[75] Inventor: Roberto Zini, Bologna, Italy

[73] Assignee: CIR S.p.A. Divisione ASAIB, Bologna, Italy

[21] Appl. No.: 27,394

[22] Filed: Apr. 5, 1979

[30] Foreign Application Priority Data

Apr. 6, 1978 [IT] Italy ............................. 12551 A/78

[51] Int. Cl.$^3$ ............................................ B01D 19/00

[52] U.S. Cl. .................................. 239/590.3; 55/194; 137/171

[58] Field of Search ................ 137/171, 206; 118/603; 55/41, 189, 190, 194, 199; 239/302, 590, 590.3, 553, 553.3, 553.5, 590.5

[56] References Cited

U.S. PATENT DOCUMENTS

| | | | |
|---|---|---|---|
| 2,797,767 | 7/1957 | Brooke et al. | 55/194 X |
| 3,442,495 | 5/1969 | Schreiber | 55/199 X |
| 4,115,085 | 9/1978 | Barbe | 118/603 X |

FOREIGN PATENT DOCUMENTS

| | | | |
|---|---|---|---|
| 211468 | 3/1925 | United Kingdom | 55/194 |

*Primary Examiner*—Andres Kashnikow
*Attorney, Agent, or Firm*—Spencer & Kaye

[57] ABSTRACT

Apparatus for feeding liquid adhesive to a nozzle applicator composed of a degasifying device, which expels the gas bubbles from the liquid adhesive, and which consists of a narrow horizontal slit to which the liquid adhesive under pressure is fed. The horizontal slit opens at the interior of a gastight buffer chamber into which there are discharged the degasified liquid adhesive and the gases expelled from the liquid adhesive. The bottom of the gas-tight chamber is connected to the nozzle applicator. A venting aperture, controlled by a plug, is provided at the top of the gastight chamber, in order to relieve the gas pressure.

11 Claims, 3 Drawing Figures

APPARATUS FOR FEEDING LIQUID ADHESIVE

STATEMENT OF PRIOR ART

In accordance with 37 CFR 1.56 and 37 CFR 1.97, applicant cites the following prior art.

U.S. Pat. No. 4,115,085 (BARBE). The whole document is of interest.

This art is the closest prior art known to applicant.

BACKGROUND AND SUMMARY OF THE INVENTION

The present invention relates to an apparatus for feeding liquid adhesives to nozzle applicators, of the type used for example in the cigarette making industry, for applying a thin layer of adhesive on the paper web which is wrapped around the tobacco rod.

The apparatuses of the known type substantially comprise a tank for the liquid adhesive and a pump for feeding the said adhesive under pressure to a nozzle applicator. Usually, the pump is of the peristaltic type, due to the fact that, in peristaltic pumps, the liquid adhesive does not come into contact with the driving components of the pump, which therefore reduces to the minimum the cleaning maintenance of the pump at the end of the working day, and consents its inactivity even for long periods of time, without any damages.

The known type apparatuses presents however at least two disadvantages. The first disadvantage derives from the fact that usually the liquid adhesive contains entrapped in it bubbles of air or other gases which, upon reaching the nozzle applicator, cause a discontinuity in the spraying of the adhesive.

A second disadvantage is represented by the fact that the peristaltic pumps present, due to their characteristic features of operation, a delivery having a discontinuous (pulsating) flow rate, which consequently affects the spraying of the nozzle applicator.

The above and other disadvantages of the known type apparatuses are eliminated by the feeding apparatus according to the present invention, which proposes the interposition, between the peristaltic pump and the nozzle applicator, of a device for expelling the gases from the liquid adhesive, which eliminates the bubbles entrapped in the adhesive, in combination with a pressure chamber for the degasified adhesive, acting as a buffer for compensating the discontinuous delivery of the peristaltic pump.

The characterizing features of the invention and the advantages deriving therefrom will appear evident from the following description of a preferred embodiment, made with reference to the attached drawings.

DESCRIPTION OF THE PREFERRED EMBODIMENT

Figure 1:
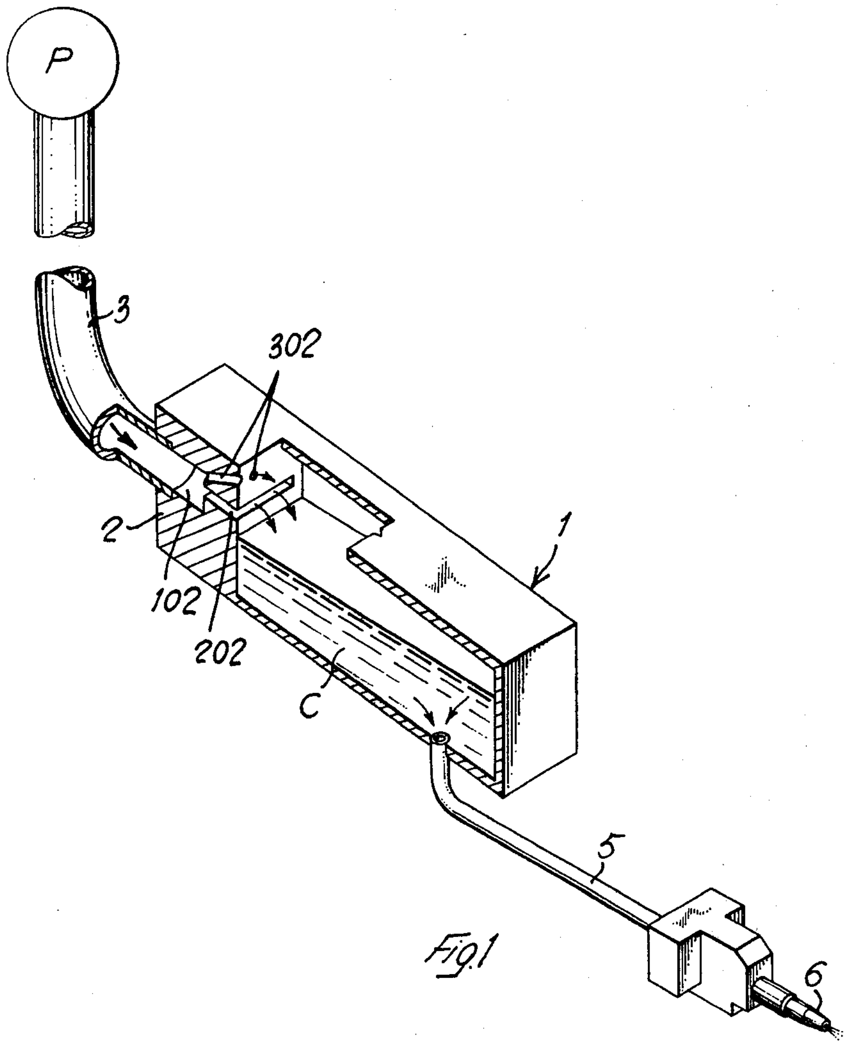
FIG. 1 is a perspective view, partially open and cutaway, of a feeding apparatus according to the invention.

With reference to the drawings, the feeding apparatus comprises an airtight chamber 1, which is closed at one of its sides by a block 2. Said side block 2 presents a cylindrical fitting 102 to which there is connected the conduit or pipe 3. The pipe 3 is connected in its turn to the delivery of a known type peristaltic pump. In the block 2 there is also obtained a very narrow horizontal slit 202, which connects the said cylindrical fitting 102 with the interior of chamber 1 and presents a transverse section which is practically constant in height and progressively increases in width, in the direction from the cylindrical fitting 102 to its outlet into chamber 1. In a preferred embodiment, the height of the slit is from 0.3 to 0.7 millimeter, and preferably 0.5 millimeter. Above the said slit 202 there are also provided through bores 302 which put in communication the upper section of cylindrical fitting 2 with the upper zone of the interior of chamber 1.

The airtight chamber 1 is provided with a venting opening, closed by plug 4 or by any other suitable valve means.

In correspondence of the bottom of chamber 1 there is fitted the pipe 5, which leads to the nozzle applicator 6.

Figure 2:
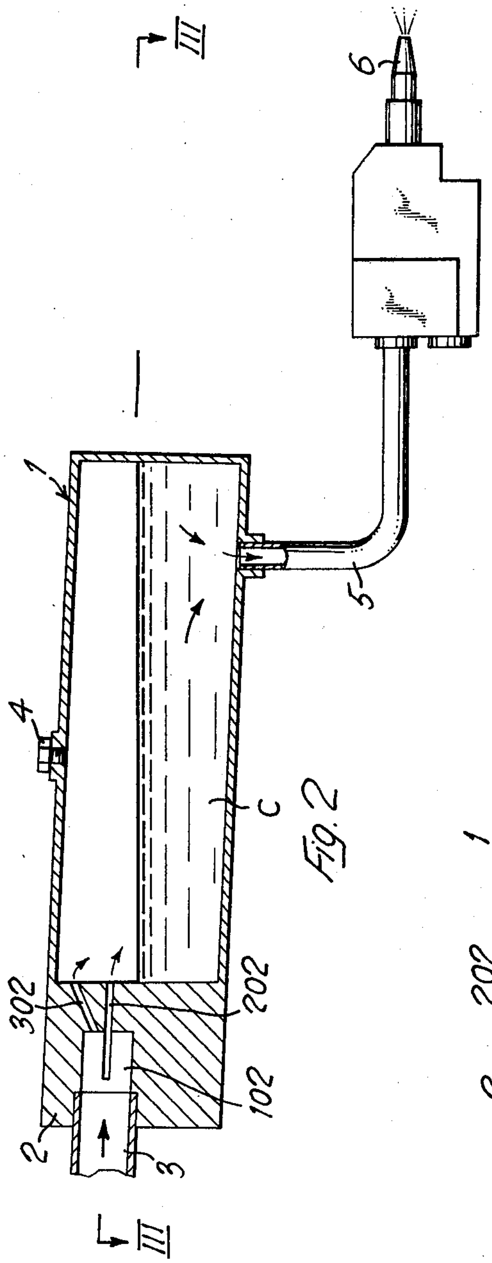
FIG. 2 is a longitudinal vertical section, with parts in view, of the apparatus of FIG. 1.
Figure 3:
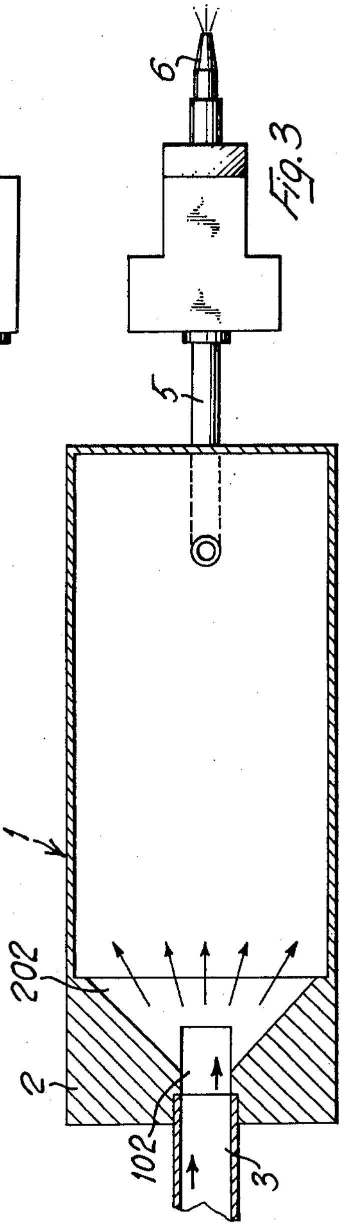
FIG. 3 is a horizontal section, with parts in view, along line III—III of FIG. 2.

As it clearly appears from FIGS. 1 and 2, the airtight chamber 1 is arranged with a certain inclination, in such a manner as to increase the distance (height) between the outlet end of slit 202 and the surface of the liquid adhesive contained at the interior of said chamber.

The operation of the described apparatus is evident. The liquid adhesive pumped by the peristaltic pump arrives through pipe 3 to the cylindrical fitting 102 from which it is admitted into the chamber 1 through the horizontal slit 202. The air bubbles contained in the adhesive, by flowing through the said narrow horizontal slit 202, are laminated or broken, and therefore are in any case separated from the adhesive in correspondence of the outlet of slit 202. The greater air bubbles which could accumulate in the upper section of cylindrical fitting 102 are discharged into chamber 1 through the bores 302.

While the air or gas bubbles are eliminated in the above manner, it appears also evident that at the interior of chamber 1 there is built up a gas pressure, which depends from the characteristic features and delivery of the peristaltic pump. The said gas pressure acts on the surface of the liquid adhesive as a buffer which compensates the delivery variations of the peristaltic pump, thus contributing to render more uniform the spraying effected by the nozzle distributor 6.

The said gas pressure increases upon separation of the air bubbles from the liquid adhesive, and therefore it will be periodically necessary to relieve the said pressure by discharging air through the venting opening, acting manually on plug 4 or automatically through any suitable venting valve.

It is to be understood that the above description refers to a preferred embodiment, and that many variations and modifications, particularly in the construction of the apparatus, are possible.

I claim:

1. Apparatus for feeding liquid adhesive under pressure to an applicator, comprising:

(a) first conduit means for supplying the liquid adhesive under pressure;

(b) a degasifying device for expelling gases from the liquid adhesive, said degasifying device consisting of a narrow horizontal slit passage connected to said first conduit means, said horizontal slit passage presenting a constant height and progressively increasing in width in the direction away from said first conduit means, through which slit passage the adhesive is compelled to pass;

(c) a gastight buffer chamber receiving the degasified liquid adhesive and the expelled gases from said degasifying device; and (d) second conduit means for conducting the degasified adhesive under pressure from said buffer chamber to the applicator.

2. Apparatus for feeding liquid adhesive under pressure to an applicator, comprising:

(a) first conduit means for supplying the liquid adhesive under pressure;

(b) a degasifying device for expelling gases from the liquid adhesive, said degasifying device consisting of a narrow horizontal slit passage connected to said first conduit means, through which slit passage the adhesive is compelled to pass;

(c) a gastight buffer chamber receiving the degasified liquid adhesive and the expelled gases from said degasifying device;

(d) at least one bore-like passage arranged above said slit, and connecting said first conduit means to said gastight buffer chamber; and (e) second conduit means for conducting the degasified adhesive under pressure from said buffer chamber to the applicator.

3. Apparatus according to claim 1 or 2, in which the said horizontal slit passage is obtained in a side wall of the said gastight buffer chamber.

4. Apparatus according to claim 1, further comprising at least one bore-like passage arranged above the said slit, and connecting the said first conduit means to the said gastight buffer chamber.

5. Apparatus according to claim 1 or 2, in which a suitable venting aperture is provided in correspondence of the top section of the gastight buffer chamber, suitable means being provided for controlling the discharge of gas from the said venting aperture.

6. Apparatus according to claim 1 or 2, in which the bottom of the gastight buffer chamber is sloping in a downward direction, starting from the side presenting the horizontal slit passage.

7. Apparatus according to claim 1 or 2, in which the liquid adhesive is fed under pressure by a peristaltic pump.

8. Apparatus according to claim 1 or 2, in which the applicator is a nozzle-type applicator.

9. Apparatus according to claim 1, in which the height of the horizontal slit is 0.5 millimeter.

10. Apparatus according to claim 1 or 2, for feeding such adhesive to an applicator which applies a thin layer of the adhesive to a running web of flexible sheet material in a machine for the production of smoker's products.

11. Apparatus according to claim 1 wherein the height of the horizontal slit is from 0.3 to 0.7 millimeter.

* * * * *